United States Patent
Scheuing

(10) Patent No.: US 12,157,453 B2
(45) Date of Patent: Dec. 3, 2024

(54) METHOD AND DEVICE FOR DETERMINING A ROTATIONAL FREQUENCY OF A WHEEL

(71) Applicant: Robert Bosch GmbH, Stuttgart (DE)

(72) Inventor: Jan Scheuing, Vellberg (DE)

(73) Assignee: Robert Bosch GmbH, Stuttgart (DE)

( * ) Notice: Subject to any disclaimer, the term of this patent is extended or adjusted under 35 U.S.C. 154(b) by 603 days.

(21) Appl. No.: 17/312,537

(22) PCT Filed: Nov. 27, 2019

(86) PCT No.: PCT/EP2019/082662
§ 371 (c)(1),
(2) Date: Jun. 10, 2021

(87) PCT Pub. No.: WO2020/120131
PCT Pub. Date: Jun. 18, 2020

(65) Prior Publication Data
US 2022/0048481 A1 Feb. 17, 2022

(30) Foreign Application Priority Data

Dec. 13, 2018 (DE) ...................... 10 2018 221 713.0

(51) Int. Cl.
*G01P 3/489* (2006.01)
*B60T 8/172* (2006.01)
*G01P 21/02* (2006.01)

(52) U.S. Cl.
CPC ............ *B60T 8/1725* (2013.01); *G01P 3/489* (2013.01); *G01P 21/02* (2013.01); *B60W 2520/28* (2013.01)

(58) Field of Classification Search
CPC ........ B60T 8/1725; G01P 3/489; G01P 21/02; B60W 2520/28
See application file for complete search history.

(56) References Cited

U.S. PATENT DOCUMENTS 3,902,374 A * 9/1975 Hoffman ................. G01C 19/42
310/90.5
5,753,809 A * 5/1998 Ogusu ................... B60C 23/061
702/140
(Continued)

FOREIGN PATENT DOCUMENTS

| JP | S56-107102 A | 8/1981 |
| JP | H06-261579 A | 9/1994 |
| JP | 2000131334 A * | 5/2000 |

OTHER PUBLICATIONS

JP2000131334A (Year: 2005).*
(Continued)

*Primary Examiner* — Manish S Shah
*Assistant Examiner* — Sharad Timilsina
(74) *Attorney, Agent, or Firm* — Maginot, Moore & Beck LLP

(57) ABSTRACT

A method for determining a rotational frequency of a wheel, in particular of a motor vehicle, uses a rate of rotation sensor that has a rotary sensor assigned to the wheel and a sensor element assigned to the rotary sensor. The rotary sensor has pulse generators that are arranged in a manner distributed over its circumference and spaced evenly from one another and whose edges are recorded by the sensor element so as to determine the rotational frequency of the rotary sensor. There is provision to use an optimal filter in order to compensate a modulation caused by an eccentricity, and to adapt modulation parameters of the optimal filter through a sequential least-squares method. A time-equidistant frequency signal is subjected to short-term averaging, for example using a PT1 filter, and the modulation is modelled as sinusoidal interference and compensated.

9 Claims, 2 Drawing Sheets

(56) References Cited

U.S. PATENT DOCUMENTS

| | | | | |
|---|---|---|---|---|
| 2001/0026180 A1* | 10/2001 | Aoki | ............... | H02P 7/2805 |
| | | | | 327/162 |
| 2002/0089257 A1* | 7/2002 | Kato | ............... | H02N 2/142 |
| | | | | 310/316.02 |
| 2002/0138230 A1* | 9/2002 | Faymon | ............... | G05B 9/02 |
| | | | | 702/145 |
| 2006/0278022 A1* | 12/2006 | Ono | ............... | G01L 5/0023 |
| | | | | 73/862.322 |
| 2009/0251134 A1* | 10/2009 | Uenoyama | ............... | G01D 5/20 |
| | | | | 324/207.21 |
| 2011/0172933 A1* | 7/2011 | Winkel | ............... | F02D 41/1402 |
| | | | | 702/41 |
| 2018/0259546 A1* | 9/2018 | Corno | ............... | G01P 3/489 |

OTHER PUBLICATIONS

International Search Report corresponding to PCT Application No. PCT/EP2019/082662, mailed Mar. 9, 2020 (German and English language document) (6 pages).

* cited by examiner

METHOD AND DEVICE FOR DETERMINING A ROTATIONAL FREQUENCY OF A WHEEL

This application is a 35 U.S.C. § 371 National Stage Application of PCT/EP2019/082662, filed on Nov. 27, 2019, which claims the benefit of priority to Serial No. DE 10 2018 221 713.0, filed on Dec. 13, 2018 in Germany, the disclosures of which are incorporated herein by reference in their entirety.

The present invention disclosure relates to a method for determining a rotational frequency of a wheel, in particular of a motor vehicle, using a speed sensor, which includes a pulse generator wheel associated with the wheel and a sensor element associated with the pulse generator wheel, wherein the pulse generator wheel includes pulse generators arranged distributed uniformly spaced apart in relation to one another around its circumference, the flanks of which are detected by the sensor element to determine the rotational frequency of the pulse generator wheel.

Furthermore, the disclosure relates to a device having a control unit, which carries out the above-described method when used as intended.

BACKGROUND

In safety braking systems in motor vehicles, the speed or rotational frequency of one or more wheels of the motor vehicle is monitored, for example, to be able to recognize and prevent locking of the wheel or the like. In control units of ABS or ESP systems, the rotational frequency is determined with the aid of a speed sensor. This includes a pulse generator wheel coupled to the wheel and a body-fixed sensor element, which is associated with the pulse generator wheel. The pulse generator wheel includes a plurality of pulse generators arranged distributed uniformly around the circumference, which protrude radially in the form of teeth from the pulse generator wheel and/or are formed as magnetic poles, for example. The pulse generators are arranged spaced apart from one another, so that two flanks of each pulse generator are detectable by the sensor element. The pulse generator wheel can be optically and/or electromagnetically sampled by the sensor element here. For the determination of the rotational frequency, the number of the flanks detected by the fixed measurement interval is referenced to the time difference measured by a control unit between the respective last detected flanks of the preceding and present measurement interval.

Because of manufacturing, the pulse generator wheel can have an eccentricity, however, whereby a sinusoidal modeled indexing error acts on the time difference between the detected flanks. Amplitude and phasing are dependent here on the individual pulse generator wheel, but are not velocity dependent. A static imbalance of the pulse generator wheel can also result in an eccentricity effect if it causes a wheel-periodic radial force, which results via the mechanical system of the mounting of the wheel in a wheel-periodical modulation of the dynamic rolling radius and also has an effect like a sinusoidal modeled indexing error. In contrast to the manufacturing-related eccentricity, however, a change of amplitude and phasing typically also occurs here as a function of the rotational velocity.

SUMMARY

The method according to the disclosure has the advantage that an angle-periodic modulation which is caused by the eccentricity is directly compensated in the time-equidistant frequency signal. Signals are exclusively used here which are typically used in any case for signal conditioning of a speed sensor, so that the method can be implemented with little effort and also only requires few resources. The method according to the disclosure is distinguished in that an optimal filter is used to compensate for the modulation of the output signal of the sensor element caused by the eccentricity, and that modulation parameters of the optimal filter are adapted by a sequential least-squares method.

Preferably, a short-term mean value is calculated for this purpose from the detected rotational frequency of the sensor signal. This is used as the advantageous foundation for the determination and compensation using the modulation.

In particular, the short-term mean value is ascertained by means of a PT1 filter. A simple and timely ascertainment is ensured in this way, using a filter coefficient which is settable in particular.

Furthermore, it is preferably provided that the modulation is modeled as a function of the short-term mean value. The short-term mean value is thus also taken into consideration, whereby a weighted consideration may be represented.

In particular, the modulation is modeled as a function of a current wheel speed. A rotational velocity of the modeled modulation is thus also taken into consideration.

Furthermore, it is preferably provided that to determine the modulation parameters, a deviation of the detected rotational frequency from its short-term mean value is modeled as a superposition of the modulation and a residual noise to be minimized.

Preferably, in the determination of the modulation parameters, a predefinable correction factor is additionally taken into consideration, in particular as a function of a current variance of the rotational frequency. If the rotational frequency varies so that it has a variance, the correction factor is thus advantageously adapted to compensate for this variance.

Furthermore, it is preferably provided that one or more frequency-selective filters are connected upstream or downstream of the optimal filter. The optimal filter is thus easily incorporated into an existing filter structure. The requirements for the damping behavior of the frequency-selective filter are now advantageously determined by the residual noise obtained from the optimal filter, whereby the conditioned speed signal is improved with respect to residual ripple or measurement dynamics.

Furthermore, it is preferably provided that the method ends upon falling below a predefinable rotational frequency and all parameters are reset. For example, if the rotational frequency falls below a predefinable rotational frequency, which indicates that a velocity of the motor vehicle has fallen below a minimum velocity of the motor vehicle of, for example, 1 km/h, all parameters or variables of the method are thus reset, whereby the method is made robust in relation to changes of the rotational direction, standstill pulses of the rotational angle sensor, and the rotational starting angle.

The device according to the disclosure is distinguished in that the control unit is especially configured to carry out the method according to the disclosure when used as intended. The above-mentioned advantages result in this way.

BRIEF DESCRIPTION OF THE DRAWING

Further advantages and preferred features and feature combinations result in particular from the description above and from the claims. The disclosure will be explained in more detail hereinafter on the basis of the drawings. In the figures

DETAILED DESCRIPTION

Figure 1:
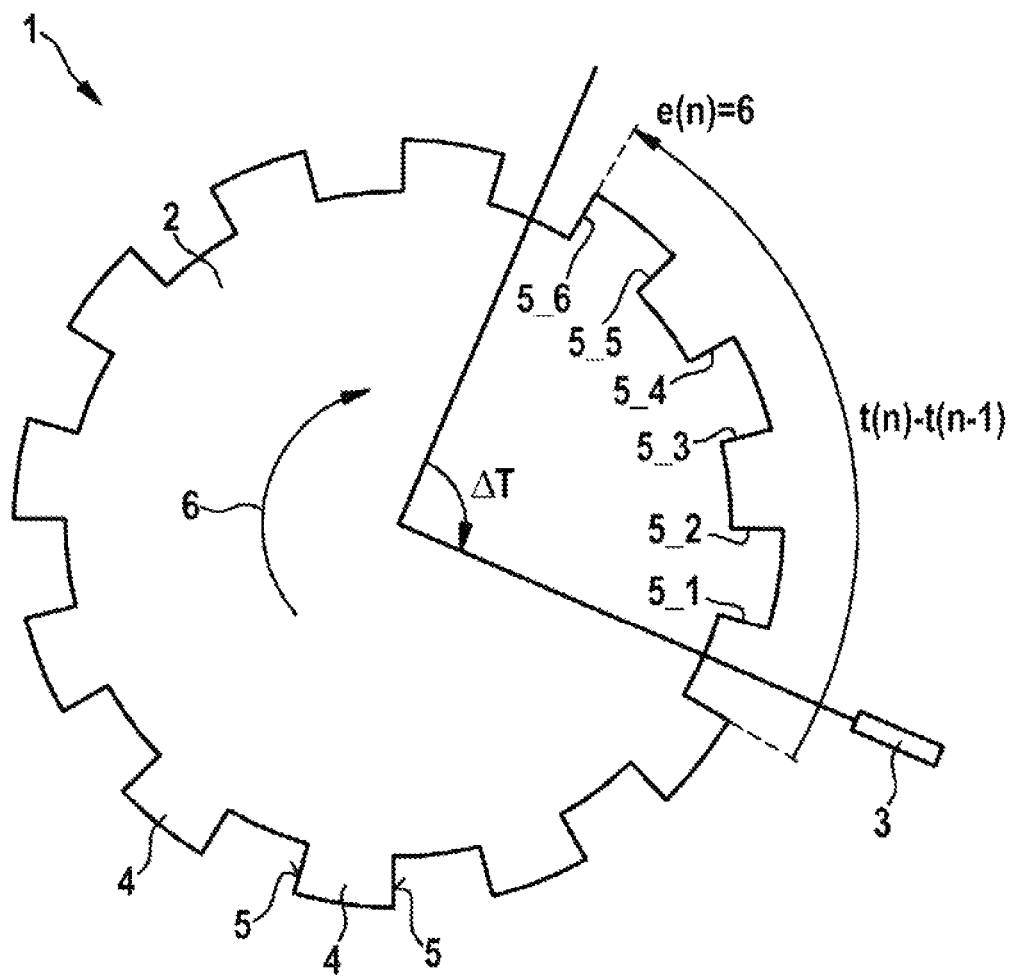
FIG. 1 shows a speed sensor for a motor vehicle in a simplified illustration and FIG. 2 shows a method for determining a rotational frequency in the form of a signal processing plan.

FIG. 1 shows a simplified illustration of a speed sensor 1 for a motor vehicle. The speed sensor 1 includes a pulse generator wheel 2, with which a sensor element 3 is associated. The sensor element 3 is associated radially with the outer circumference of the pulse generator wheel 2 and is situated fixed in the housing. The pulse generator wheel 2 is coupled in a rotationally-fixed manner to a shaft, for example of a drive wheel of the motor vehicle. The pulse generator wheel 2 includes multiple pulse generators 4 situated uniformly spaced apart from one another distributed around its circumference. In the present exemplary embodiment, these are formed as radially protruding circular ring segments or teeth, which are each delimited in the circumferential direction by two flanks 5. Alternatively, the pulse generators 4 are formed, for example, as magnetic poles of a magnetic multi-pole wheel, axial teeth, and/or pinhole apertures. In the present case, the pulse generator wheel 2 is a pole wheel having a plurality of pole pairs $N_P$, which are formed in particular by one or more permanent magnets. The instantaneous rotational frequency f of the wheel or the pulse generator wheel 2 is determined in particular by means of a control unit, in particular an ABS/ESP control unit, at a time $n*\Delta T$ in that the number e of the flanks 5 of the pulse generator wheel 2 or the pulse generators 4 detected in a fixed measurement interval $\Delta T$ with, for example, $\Delta T=5$ ms, is referenced to the time difference measured by the control unit between the respective last detected flanks of the preceding and the current measurement interval $t(n)-t(n)-1$. In the present exemplary embodiments, six flanks 5_1 to 5_6 are detected within the measurement interval $\Delta T$ by the sensor element 3, wherein the pulse generator wheel 2 rotates clockwise according to arrow 6 in the plane of the paper.

Theoretically, a transition from the (ideally) angle-equidistant sampling of the sensor element, which is given by the regular arrangement of the pulse generators on the pulse generator wheel 2, to a time-equidistant sampling in the raster $\Delta T$ takes place in the control unit. The factor of this sampling or subsampling is velocity-dependent. The faster the wheel rotates, the more flanks e are detected in the time interval $\Delta T$, so that averaging takes place over more flanks e.

The rotational velocity and also, from its time derivative, the rotational acceleration are determined from the now time-equidistant rotational frequency via the circumference of the pulse generator wheel 2 and the number of the pulse generator pairs $N_P$.

Because of manufacturing, a structural eccentricity of the encoder wheel can occur, i.e., a displacement of the center of gravity of the pulse generator wheel in relation to an imaginary center, from which the pulse generators 4 are distributed in an angle-equidistant manner. From the time difference at constant rotational velocity between the flanks 5 detected by the sensor element 3 (angle-equidistant signal), this eccentricity acts in a first approximation like a sinusoidal modeled indexing error having the period $N_P$. The amplitude and phasing of this superposition are dependent on the individual pulse generator wheel 2, but are not dependent on the rotational velocity.

A further eccentricity can result due to a static imbalance of the pulse generator wheel 2. This imbalance causes a wheel-periodic radial force, which results via the mechanical system of a wheel suspension in a wheel-periodic modulation of the dynamic rolling radius and also acts in the signal like a sinusoidal modeled indexing error having period $N_P$. Because of the resonance behavior of the mechanical system, a change of amplitude and phasing is caused here as a function of the rotational velocity.

The eccentricity caused by a modulation in a time-equidistant frequency signal is advantageously compensated for by the method described hereinafter. It is provided that an optimal filter is used for the compensation, the modulation parameters of which are adapted by a sequential least-squares method.

This optimal filter is advantageously used in addition to frequency-selective filters, in particular the optimal filter is connected upstream of the frequency-selective filters. The requirements for its damping behavior are advantageously now only determined by the residual noise. In this way, the conditioned speed signal can be improved with respect to residual ripple or measurement dynamics. Exclusively signals already used in any case for signal conditioning are used by the advantageous method, so that significantly less implementation effort and resource expenditure are necessary in relation to a compensation in the angle-equidistant signal.

Figure 2:
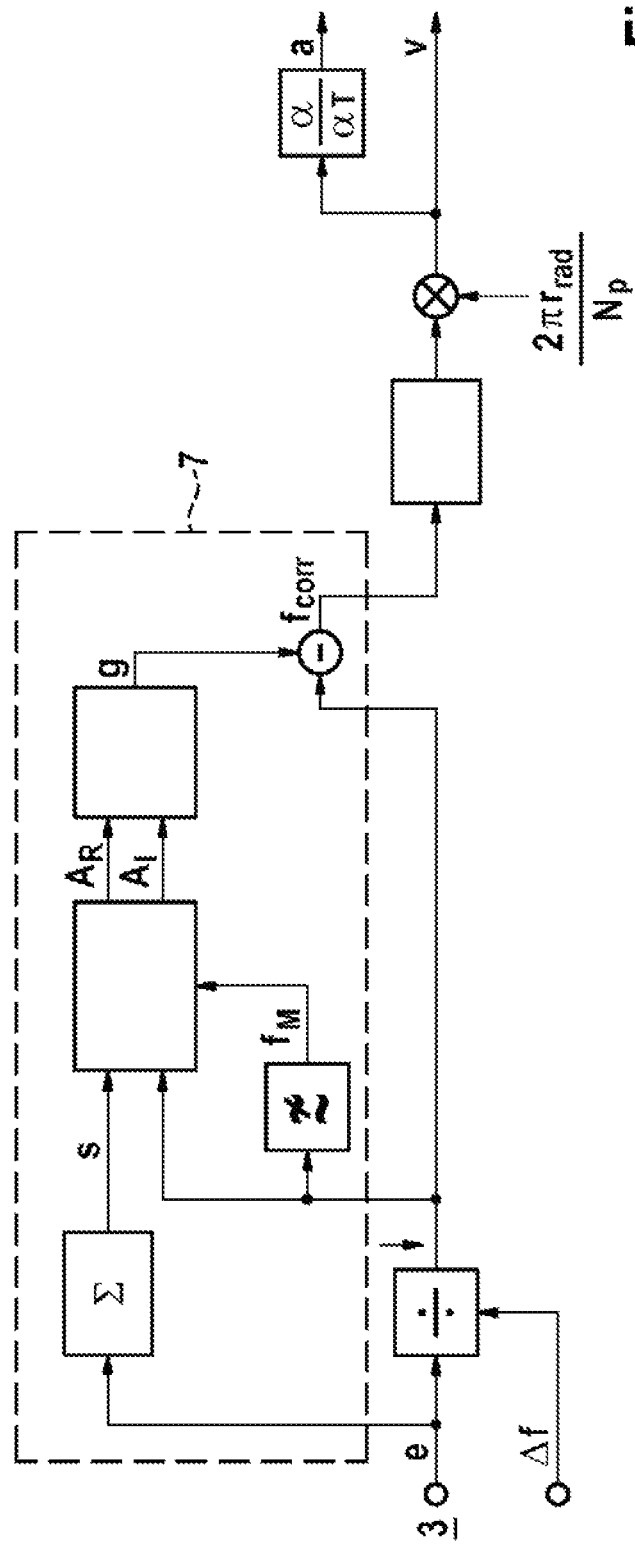

The advantageous method is to be explained with the aid of the flow chart or signal flow diagram shown in FIG. 2.

According to the disclosure, firstly its short-term mean value $f_M(n)$ is calculated from the wheel frequency $f(n)$, for example by PT1 filtering having a settable filter coefficient c1 with, for example, value 0.1:

$$f_M(n)=f_M(n-1)+c_1 \cdot (f(n)-f_M(n-1))$$

The wheel-periodic modulation g(n) caused by eccentricity is modeled as the superposition weighted with $f_M$ $$g(n)=f_M(n) \cdot (A_R \cos s(n)+A_I \sin s(n))$$

wherein $A_R$ and $A_I$ represent the modulation parameters still to be estimated and s(n) represents the instantaneous wheel angle determined by accumulation of the flank numbers:

$$s(n) = \frac{2\pi}{N_P} \cdot \left[\left(\sum_{i=0}^{n} e(i)\right) \bmod N_P\right]$$

In this case, a continuous detection of all flanks and a constant wheel rotational direction are assumed. The method is preferably stopped if the velocity falls below a minimum velocity (for example 1 km/h) and all variables are reset, in this way the method is made robust in relation to changes of the rotational direction, standstill pulses of the sensor, and also the wheel starting angle acting on the distribution between $A_R$ and $A_I$.

The model approach for g(n) is selected so that with suitable estimation of $A_R$ and $A_I$, a sinusoidal modulation with period $N_P$ in the corrected frequency signal $$f_{corr}(n)=f(n)-g(n)$$

is compensated (optimum filter approach). The estimation of $A_R$ and $A_I$ at the runtime takes place, as already mentioned, via a least-squares method, in that the deviation of the instantaneous wheel frequency f(n) from its short-term mean value $f_M(n)$ is modeled as the superposition of the modulation g(n) and a residual noise to be minimized:

$$\sum_{i=0}^{n}|f(i)-f_M(i)-g(i)|^2 \rightarrow \min$$

or in matrix notation:

$$\left\| \underbrace{\begin{bmatrix} f_M(n) \cdot \cos s(n) & f_M(n) \cdot \sin s(n) \\ f_M(n-1) \cdot \cos s(n-1) & f_M(n-1) \cdot \sin s(n-1) \\ \vdots & \vdots \end{bmatrix}}_{\underline{M}} \cdot \begin{bmatrix} A_R \\ A_I \end{bmatrix} - \underbrace{\begin{bmatrix} f_M(n) - f(n) \\ f_M(n-1) - f(n-1) \end{bmatrix}}_{\underline{F}} \right\|^2 \rightarrow \min$$

with the least-squares solution $$\begin{bmatrix} A_R \\ A_I \end{bmatrix} = (\underline{M}^T \underline{M})^{-1} \underline{M}^T \underline{F}$$

The sums resulting upon the matrix inversion, which grow with n, are preferably replaced by their short-term mean values. In a particularly resource-preserving embodiment, these short-term mean values are approximated by PT1-filtered mean values, so that the estimation can then be reduced to $$A_R = \frac{S2 \cdot S4 - S3 \cdot S5}{S1 \cdot S2 - S3^2} \text{ and}$$

$$A_I = \frac{S1 \cdot S5 - S3 \cdot S4}{S1 \cdot S2 - S3^2}$$

with the iteratively filtered sum variables and settable parameter c (with, for example c=0.4)

$S1(n)=S1(n-1)+c \cdot ((f_M(n) \cdot \cos s(n))^2 - S1(n-1))$ $S2(n)=S2(n-1)+c \cdot ((f_M(n) \cdot \sin s(n))^2 - S2(n-1))$ $S3(n)=S3(n-1)+c \cdot (f_M^2(n) \cdot \cos s(n) \cdot \sin s(n) - S3(n-1))$ $S4(n)=S4(n-1)+c \cdot (f_M(n) \cdot \cos s(n) \cdot (f(n)-f_M(n)) - S4(n-1))$ $S5(n)=S5(n-1)+c \cdot (f_M(n) \cdot \sin s(n) \cdot (f(n)-f_M(n)) - S5(n-1))$ In a further embodiment of the method, the parameter c is selected as a function of the instantaneous variance of f(n), so that the adaptation speed of the sum variables decreases in the case of high variance.

Alternatively, the sum variables are determined as actual sliding mean values, for example for S1(n) in the form $$S1(n) = \frac{1}{L} \cdot \sum_{i=n-L+1}^{n} (f_M(i) \cdot \cos s(i))^2$$

with, for example, L=8, (applies analogously to S2 to S5).

In a further optimized embodiment, the wheel angle s(n) ascertained from summation to the end of the measurement interval is replaced by the mean wheel angle of the measurement interval $s_M(n)$ $$s_M(n) = \frac{2\pi}{N_P} \cdot \left[ \left( \frac{e(n)}{2} + \sum_{i=0}^{n-1} e(i) \right) \bmod N_P \right]$$

Preferably, all filter parameters (as indicated) are to be selected so that the group runtime is small in relation to the signal dynamic range to be expected. The adaptation can then also follow the velocity-dependent amplitudes and phase changes of a possibly superimposed wheel imbalance and the described method will also compensate for this.

The invention claimed is:

1. A method for determining a rotational frequency of a wheel using a speed sensor including a pulse generator wheel associated with the wheel and a sensor element associated with the pulse generator wheel, the pulse generator wheel including pulse generators situated uniformly spaced apart from one another distributed around a circumference of the pulse generator wheel, the method comprising:
   detecting flanks of the pulse generator wheel using the sensor element;
   determining a rotational frequency of the pulse generator wheel based on the detected flanks;
   compensating for a modulation caused by an eccentricity using an optimal filter;
   adapting modulation parameters of the optimal filter by a sequential least-squares method when the determined rotational frequency is above a predefined rotational frequency; and
   resetting the modulation parameters when the determined rotational frequency is below the predefined rotational frequency,
   wherein adapting the modulation parameters comprises adapting the modulation parameters based on a predefinable correction factor, and
   wherein the predefinable correction factor is a function of a variance of the rotational frequency of the pulse generator wheel.

2. The method as claimed in claim 1, further comprising:
   calculating a short-term mean value from the determined rotational frequency of the pulse generator wheel.

3. The method as claimed in claim 2, further comprising:
   ascertaining the short-term mean value using a PT1 filter.

4. The method as claimed in claim 2, further comprising:
   modeling the modulation as a function of the calculated short-term mean value.

5. The method as claimed in claim 1, further comprising:
   ascertaining the modulation as a function of a current wheel speed.

6. The method as claimed in claim 1, wherein adapting the modulation parameters, comprises:
   modeling a deviation of a currently detected rotational frequency of the pulse generator wheel from a corresponding short-term mean value as a superposition of the modulation and a residual noise to be minimized.

7. The method as claimed in claim 1, further comprising:
   connecting one or more frequency-selective filters upstream or downstream of the optimal filter.

8. The method as claimed in claim 1, further comprising:
   ending the method when the determined rotational frequency of the pulse generator wheel falls below the predefined rotational frequency.

9. A device for determining a rotational frequency of a wheel of a motor vehicle, comprising:
   a speed sensor including a pulse generator wheel associated with the wheel of the motor vehicle and a sensor element associated with the pulse generator wheel; and
   a control unit operably connected to the speed sensor, wherein the pulse generator wheel includes pulse generators situated uniformly or spaced apart from one another distributed around a circumference of the pulse generator wheel, wherein flanks of the pulse generator wheel are detected by the sensor element to determine a rotational frequency of the pulse generator wheel, and wherein the control unit is configured to:
- determine the rotational frequency of the pulse generator wheel based on the detected flanks,
- compensate for a modulation caused by an eccentricity using an optimal filter,
- adapt modulation parameters of the optimal filter by a sequential least-squares method in order to determine the rotational frequency of the wheel when the determined rotational frequency is above a predefined rotational frequency, and
- reset the modulation parameters when the determined rotational frequency is below the predefined rotational frequency, wherein adapting the modulation parameters comprises adapting the modulation parameters based on a predefinable correction factor, and wherein the predefinable correction factor is a function of a variance of the rotational frequency of the pulse generator wheel.

* * * * *